(12) United States Patent
Neumann

(10) Patent No.: US 10,091,189 B2
(45) Date of Patent: Oct. 2, 2018

(54) SECURED DATA CHANNEL AUTHENTICATION IMPLYING A SHARED SECRET

(71) Applicant: ADUCID s.r.o, Brno (CZ)

(72) Inventor: Libor Neumann, Praha (CZ)

(73) Assignee: ADUCID S.R.O., Brno (CZ)

( * ) Notice: Subject to any disclaimer, the term of this patent is extended or adjusted under 35 U.S.C. 154(b) by 67 days.

(21) Appl. No.: 14/893,058

(22) PCT Filed: May 21, 2014

(86) PCT No.: PCT/CZ2014/000058
§ 371 (c)(1),
(2) Date: Nov. 21, 2015

(87) PCT Pub. No.: WO2014/187436
PCT Pub. Date: Nov. 27, 2014

(65) Prior Publication Data
US 2016/0119317 A1   Apr. 28, 2016

(30) Foreign Application Priority Data

May 22, 2013  (CZ) .............................. PV 2013-373

(51) Int. Cl.
*H04L 9/32* (2006.01)
*G06F 17/00* (2006.01)
(Continued)

(52) U.S. Cl.
CPC .......... *H04L 63/083* (2013.01); *H04L 9/3247* (2013.01); *H04L 63/0442* (2013.01);
(Continued)

(58) Field of Classification Search
CPC . H04L 63/083; H04L 9/3247; H04L 63/0442; H04L 63/061; H04L 63/18; H04L 2463/061
(Continued)

(56) References Cited

U.S. PATENT DOCUMENTS

2004/0034776 A1* 2/2004 Fernando .............. H04L 9/0825
                                                                                    713/171
2005/0120213 A1   6/2005 Winget et al.
(Continued)

FOREIGN PATENT DOCUMENTS

WO        2014187436       11/2014

OTHER PUBLICATIONS

International Search Authority, Written Opinion of the International Searching Authority dated Sep. 15, 2014 issued on International Application No. PCT/CZ2014/000058 in the name of ANECT A.S.
(Continued)

*Primary Examiner* — Aravind K Moorthy
(74) *Attorney, Agent, or Firm* — Franklin & Associates International Inc; Matthew Lambrinos

(57) ABSTRACT

The invention solves the way of authentication of secured data channel between two sides (A, B) when there is at first established a non-authenticated protected data channel (1), with ending (3) of the data channel (1) on the first side (A) and ending (4) of the data channel (1) on the other side (B) and with target application (7) on the first side (A) and target application (8) on the other side (B), while the endings (3) and (4) have a non-authenticated shared secret (5), consequently, on both sides (A, B) of the data channel (1) there are calculated the data derived from non-authenticated shared secret (5), then the data derived from the non-authenticated shared secret (5) are passed via external communication means out of the data channel (1) to two sides (11, 12) of the
(Continued)

Figure 1:
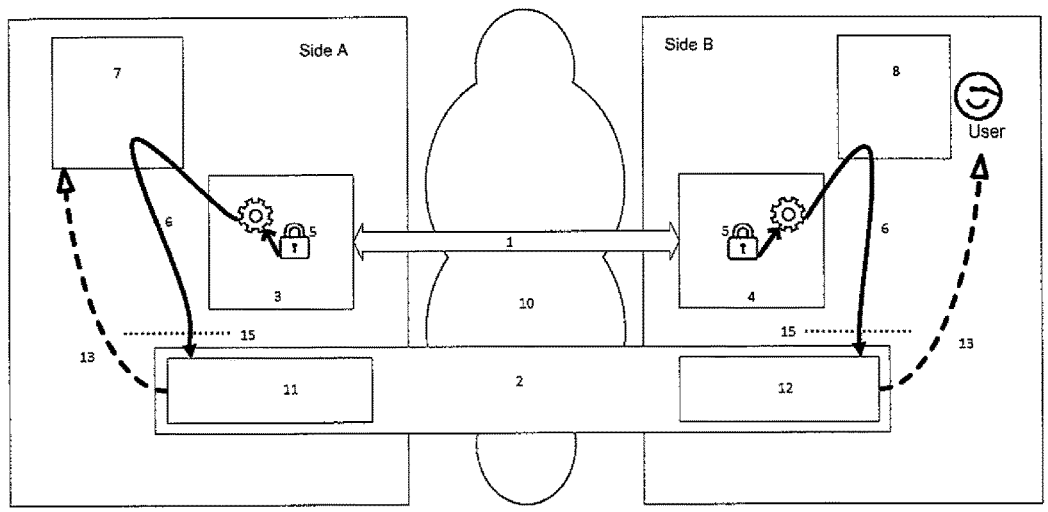

external authentication system (2), which consequently performs authentication of communicating sides (A, B) including authentication of the data channel (1).

17 Claims, 2 Drawing Sheets

(51) Int. Cl.
    *H04L 9/00*           (2006.01)
    *H04L 29/06*         (2006.01)

(52) U.S. Cl.
    CPC ............ *H04L 63/061* (2013.01); *H04L 63/18* (2013.01); *H04L 2463/061* (2013.01)

(58) Field of Classification Search
    USPC ........ 713/171, 168; 726/12, 14, 15; 380/262
    See application file for complete search history.

(56) References Cited

U.S. PATENT DOCUMENTS

| | | |
|---|---|---|
| 2007/0136800 A1 | 6/2007 | Chan et al. |
| 2000/9288143 | 11/2009 | Stebila et al. |
| 2010/0042838 A1 | 2/2010 | Ho |

OTHER PUBLICATIONS

The International Bureau of WIPO, International Preliminary Report on Patentability dated Nov. 24, 2015 issued on International Application No. PCT/CZ2014/000058 in the name of ANECT A.S.
International Search Authority, International Search Report dated Sep. 15, 2014 issued on International Application No. PCT/CZ20141000058 in the name of ANECT A.S.

\* cited by examiner

SECURED DATA CHANNEL AUTHENTICATION IMPLYING A SHARED SECRET

CROSS REFERENCE TO RELATED APPLICATIONS

This application is the National Stage of International Patent Application No. PCT/CZ2014/000058, filed 21 May 2014, which claims priority under 35 U.S.C § 119 to CZ patent application PV 2013-373, filed 22 May 2013.

TECHNICAL FIELD

The invention relates the method of verification of the electronic identity of a secured data channel user during remote electronic communication between two parties.

BACKGROUND ART

A secured data channel is used in case of remote access of users or systems to protected assets in the information systems of the service provider. Protected assets may be of variable character—these may be confidential information or information designed for publication, but allowed to be changed by authorised persons only or it may relate to realisation of various actions or transactions using information and communication technologies, or it may concern setting of instructions for various devices, obtaining measured or otherwise obtained information or data.

Data channel security is the limiting factor of the protection level of protected assets during remote access. The general level of protected assets security cannot be higher than the data channel security. That emerges from general rules of security, where the general security level is set by the level of the weakest element security.

The data channel security is limited by authentication, i.e. verified establishment of identity of systems or users respectively operators or owners of systems on both ends of data channel.

Authentication—the verification of electronic identity, typically performed on remote basis before target electronic service use—is performed before creation of a secured data channel or as a part of the data channel creation, before start of data transfer through the data channel.

The data channel is used for protection of data transfer in case of remote access to the target electronic service as protection of an authorised user from access of unauthorised users, e.g. an attacker, to the service.

A secured data channel is protected by an authenticated shared secret, which is known only to systems on both data channel ends. The authenticated shared secret creation includes the identity check—authentication of users respectively systems on both data channel ends.

Another known variant is that the data channel is created without authentication or with partial authentication and it is consequently used for user's authentication for target application. In such a case, the data channel uses non-authenticated shared secret and it cannot act as a secure one, as it may be abused by an attacker, as there was not performed any full-value data channel authentication and the attacker may abuse or otherwise attack even the authentication of the user for the target application and consequently successfully attack even the target application.

So as to ensure security of the data channel and the target application it was necessary to perform double authentication—for the data channel and target application or to connect the data channel and the target application in some other way.

There are known some methods of the target application connection with the data channel (Channel Bindings) serving for improvement of application communication security, using the result of data channel authentication performed before creation or at the moment of creation of the data channel in the authentication performed by the application.

External authentication is not used for data channel authentication at the present time. The user respectively the system to be authenticated have available the authentication secrets (credentials) that they may use directly for authentication for example in case of authentication by password or they will use the secret to perform an appropriate cryptographic operation needed for authentication as in case of using authentication by a Public Key Infrastructure.

The aim of the invention is to eliminate the current weak point of electronic communication security, i.e. insufficient, non-functional, weak or hardly usable authentication of secure channel and to increase in this way the resistance of mainly remote electronic communication against various even highly qualified attacks and to significantly decrease in this way the risks of electronic communication.

More, the aim of the presented invention is to simplify the use of external authentication by simplifying the data transfer between the external authentication system and data channel, respectively target application to a one-way transfer at one moment. That allows use of other technologies for data transfers—they are commonly available and they could not be used for more complicated methods of data transfer.

Base of the Invention

The subject of the invention is the method of a secured data channel authentication, characterised by the fact that at first a non-authenticated encrypted data channel is created between two parties using a non-authenticated shared secret obtained based on use of ordinary cryptographic methods, e.g. using key-agreement, guaranteeing existence of only two ends of the data channel or a temporarily generated pair of cryptographic keys.

Then, using the non-authenticated data channel, the information needed for authentication of a user and data channel may be (confidentially) transferred by e.g. external authentication service URL, challenge, authentication/data session identifier.

Consequently, the data channel ending on both sides creates a cryptographic derivate of non-authenticated shared secret of the data channel, e.g. using a pseudo-random cryptographic function using the signature by the shared secret. The method of derivate creation guarantees that both derivates of shared secret calculated on both endings of the data channel have an identical value in case of the shared secrets to be identical. The calculation may be performed e.g. using ordinary asymmetrical pseudo-random algorithms of the type HASH or HMAC.

Then—using the external communication means on both ends of the data channel, but out of the data channel—there are transferred the data derived from non-authenticated shared secret, at least a derivate of non-authenticated shared secret of the data channel or its derived information to the appropriate inputs of external authentication (external authentication system or service).

The data derived from the non-authenticated shared secret can be the derivate of the non-authenticated shared secret or a modified derivate of the non-authenticated shared secret, e.g. obtained by modification with additional data or a derivate calculated from the non-authenticated shared secret and additional data or a derivate calculated from non-authenticated shared secret and additional data and further modified, e.g. by additional data. The modification by additional data may be performed by the data channel endings or by target applications on each side of the data channel and/or by the side of the authentication system. The modification may be performed on both sides of the data channel by the same component or by a different component on each side of the data channel. The additional and/or supplemental data may be created by the data channel ending and/or by the target application and/or by the side of the external authentication system. The additional and/or supplemental data may be created on both sides of the data channel by the same component or by a different component on each side of the data channel.

After the external authentication receives data derived from the non-authenticated shared secret on both ends of the data channel, the external authentication performs authentication of passed data derived from non-authenticated shared secret of the data channel, usually by using user's or provider's authentication secret accessible by external authentication, all of that in such a way that there is connected in a cryptographically reliable way the authentication of data derived from non-authenticated shared secret and authentication of the user respectively the system, e.g. using a signature or encrypting by the secret or by otherwise authenticated secret.

The external authentication is a special system, a set of programmes and devices or an electronic service able to independently perform authentication of users respectively systems and other authenticated secure operations including authentication of data derived from non-authenticated shared secret of a data channel which is separated from the data channel and it does not use the data channel for transfer of information.

External communication means may e.g. use the technology of local communication, like easily and intuitively performable optical communication using scanning and displaying of QR codes, like technologies of wireless communication on short distances, optical communication, local network, built-in internal communication in the device or other ordinary appropriate means like e.g. internal network of the service provider or internal protected network of "cloud" service providers respectively secure remote communication.

Authentication of data derived from non-authenticated shared secret may be performed using the External authentication system e.g. based on comparison of derivates developed from data derived from non-authenticated shared secret and authenticated secret of the user and/or system or it may be performed using the External authentication system via a cryptographic signature using the temporary signature key authenticated during authentication of the user and/or system using the External authentication; or it may be performed using the External authentication system by encrypting using a temporary encryption key authenticated during authentication of the user and/or system using the External authentication system; or it may be performed using the External authentication system by comparison of derivates developed from data derived from non-authenticated shared secret and temporary secret authenticated during authentication of the user and/or system using the External authentication system; or it may be performed using the External authentication system in such a way that handed over data derived from the non-authenticated shared secret of the data channel will be used by the External authentication system for authentication of the user in such a way that these will replace the challenge while using the authentication protocols of the challenge-response type.

In this way there will also be authenticated the data channel resp. its shared secret, i.e. there is authenticated the user respectively the system on both ends of the external authentication system as well as the data channel.

The result of authentication may consequently pass the external authentication (authentication system/service) to the target application including relevant information on authenticated user or system as well as on the user or system on the other side of the data channel.

As from the moment of successful authentication of data derived from non-authenticated shared secret of the data channel the data channel is authenticated and it becomes a secure authenticated data channel that may be used by an authenticated target application for secure communication with authenticated user of the target application.

The user means a real person using the relevant electronic device as well as the electronic system or electronic device itself.

LIST OF FIGURES IN DRAWINGS

FIG. 1—Schematic representation of the way of authentication of a secured data channel 1, using external authentication (External authentication system 2) according to the example of the invention realisation No. 1.

Figure 2:
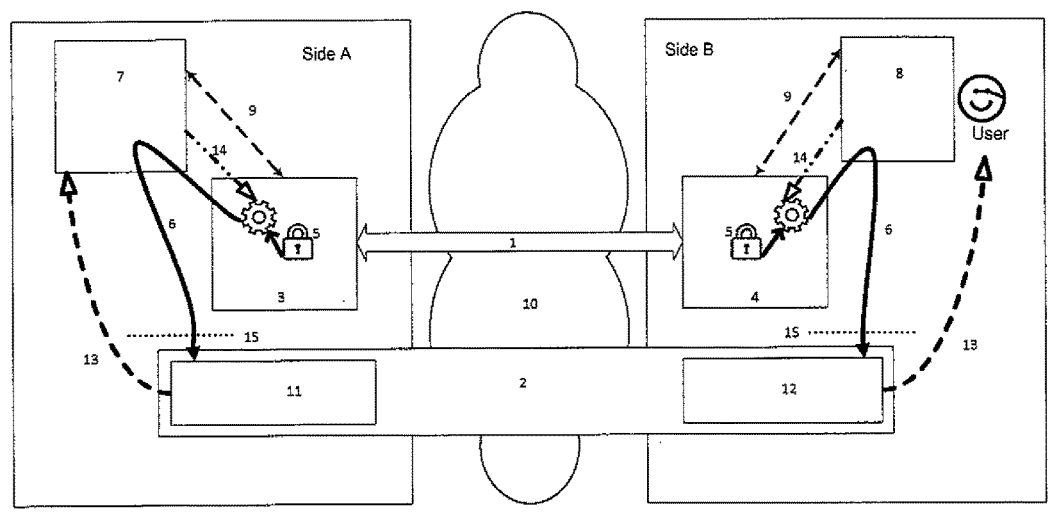

FIG. 2—Schematic representation of the way of authentication of a secured data channel 1, using external authentication (External authentication system 2) according to the example of the invention realisation No. 2.

Figure 3:
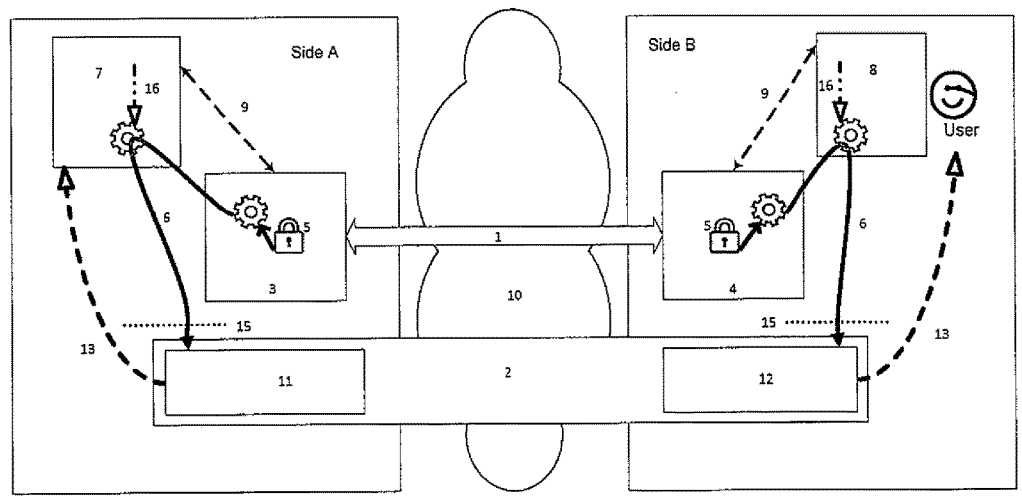

FIG. 3—Schematic representation of the way of authentication of a secured data channel 1, using external authentication (External authentication system 2) according to the example of the invention realisation No. 3.

Figure 4:
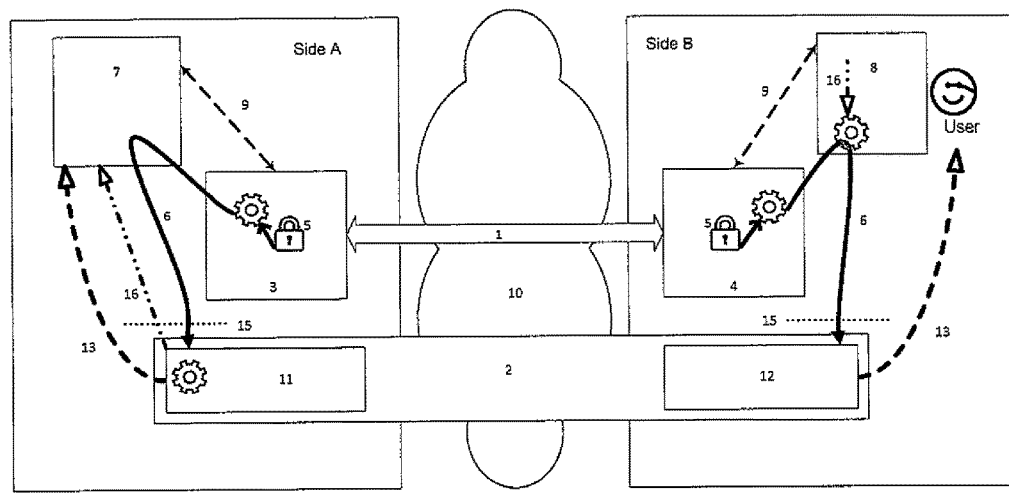

FIG. 4—Schematic representation of the way of authentication of a secured data channel 1, using external authentication (External authentication system 2) according to the example of the invention realisation No. 4.

EXAMPLES OF INVENTION REALISATION

Example 1

The way of authentication of secured data channel may be performed for example in such a way that there is created a protected non-authenticated data channel 1 between sides A and B, and there is available the External authentication system 2. The data channel 1 is terminated on both sides by the Ending 3 of the data channel on side A and Ending 4 of the data channel on side B.

The sides A and B of the Data channel 1 and sides A and B of the External authentication system 2 may communicate via wide area or local network, e.g. Internet 10.

Both endings 3 and 4 of the data channel 1 have available a secret information—the Shared secret 5, which was developed based on ordinary procedure of generation of a non-authenticated shared secret, e.g. by using the cryptographic algorithm of the key-agreement. The shared secret 5 is used in an ordinary way by both endings 3 and 4 of the data channel 1 so as to arrange security of data transferred by the Data channel 1. But at this moment it has not been proved that the data are coming from the right subject, respectively that they reach the right subject, as there has not been performed any authentication by now.

For arrangement of authentication of the Data channel 1 there is consequently used the External authentication system 2 in such a way that the relevant Ending 3 and 4 of the data channel 1 calculates from the Shared secret 5 the Derivate 6 of the Shared secret 5 in such a way that on request of the Target application 7 on side A there is calculated the Derivate 6 of the Shared secret 5 by the Ending 3 of the Data channel 1 on side A and on request of the target application 8 on side B there is calculated the Derivate 6 of the Shared secret 5 by the Ending 4 of the Data channel 1 on side B. The way of calculation guarantees that both of the Derivates 6 of the shared secret 5 calculated by both of the Endings 3 and 4 of the data channel 1 have the same value in case of the Shared secrets 5 to be identical. The calculation may be performed e.g. using the ordinary asymmetrical pseudo-random algorithms of the HASH resp. HMAC type.

The Derivate 6 of the shared secret 5 is consequently passed to the External authentication system 2 via the External interface 15, which consequently performs authentication of both of the sides of communication including authentication of the Derivate 6 of the shared secret 5 of the data channel 1. In this way there is performed the authentication of the data channel 1 in connection with the sides of communication and there is proved whether the data transferred through the data channel 1 come from the right subject and that they are transferred to the right subject.

The Derivate 6 of the shared secret is passed to the External authentication system 2 in such a way that Ending 3 of the data channel 1 on side A passes the Derivate 6 of the shared secret 5 to the Target application 7 on side A, on the request of which the Derivate 6 of the shared secret 5 was calculated by the Ending 3 of the data channel 1 on side A and the Target application 7 on side A passes the Derivate 6 of the shared secret 5 through the external communication means via the External interface 15 to side 11 of the External authentication system 2 on side A. Similarly, Ending 4 of the data channel 1 on side B passes the Derivate 6 of the shared secret 5 to the Target application 8 on side B, on the request of which the Derivate 6 of the shared secret 5 was calculated by the Ending 4 of the data channel 1 on side B and the Target application 8 on side B passes the Derivate 6 of the shared secret 5 through external communication means to the side 12 of the External authentication system 2 on side B.

The way of hand over through the external communication means of the Derivate 6 of the shared secret 5 via the External interface 15 is out of the Data channel 1 and it is performed in an ordinary way, e.g. by using the technologies of local communication like technologies of wireless communication to short distances, optical communication, local network or other ordinary appropriate means like e.g. internal network of the service provider. The way of protection of transfer of the Derivate 6 of the shared secret 5 and the way of use of the External authentication system 2 arranges the level of security that the Target application 7 and 8 on the relevant side is used by the same user as the External authentication system 2.

Consequently, the result 13 of the authentication is passed to the target application including other relevant information on authenticated user or system on side A as well as on user (or system) on side B.

Example 2

Another way of authentication of the secured data channel may be performed e.g. in such a way that there is developed a protected non-authenticates Data channel 1 between the sides A and B at first, e.g. by using a generally available implementation of encrypted data channel like TLS according to RFC 5246, which does not use the authentication option, and there is available the External authentication system 2. The Data channel 1 is terminated on both sides by Ending 3 of the data channel on side A and Ending 4 of the data channel on side B. Both of the endings 3 and 4 of the data channel 1 have available a secret information—the Shared secret, which was generated based on ordinary procedure of generation of a non-authenticated shared secret, e.g. by using the cryptographic algorithm of the key-agreement. The shared secret 5 is used in an ordinary way by both endings 3 and 4 of the data channel 1 so as to support security of data transferred by the Data channel 1. But at this moment it has not been proved that the data are coming from the right subject, respectively that they reach the right subject, as there has not been performed any authentication by now.

Then, the Target application 7 on side A passes for transfer to the Ending 3 of the data channel 1 on side A the Data 9 of the target application to be transferred in encrypted form by the Data channel 1 using the Shared secret 5, decrypted by Ending 4 of the data channel on side B and passed to the Target application 8 on side B.

The transferred Data 9 of the target application may contain e.g. technical information needed for correct function of the External authentication system 2, like the network address of the External authentication system—side A 11, identifier of authenticated session, other information designed for improvement of security like "nonce" i.e. additional information with high entropy.

The Target application 7 on side A processes Data 9 designed for transfer and Target application 8 on side B processes the transferred Data 9 in such a way that makes the Additional data 14 from them, always on the relevant side. The way of calculation guarantees that both the Additional data 14 calculated by both of the Target applications 7 and 8 have an identical value in case of the transferred Data 9 to be correctly transferred and decrypted.

For arrangement of authentication of the data channel 1 there is consequently used the External authentication system 2 in such a way that the relevant Ending 3 and 4 of the data channel 1 calculates from the Shared secret 5 and from Additional data 14 the Derivate 6 of the shared secret 5—it is done in such a way that on request of the Target application 7 on side A, passing the Additional data 14 created by the Target application 7 on side A there is calculated the Derivate 6 of the shared secret 5 by the Ending 3 of the data channel on side A and on request of the Target application 8 on side B, passing the Additional data 14 developed by the Target application 8 on side B, there is calculated the Derivate 6 of the shared secret 5 by the Ending 4 of the data channel on side B. The way of calculation guarantees that both of the Derivates 6 of the shared secret 5 calculated by both of the Endings 3 and 4 of the data channel have an identical value in case of all the inputs to be identical. The calculation may be performed using e.g. ordinary asymmetrical pseudo-random algorithms of the HASH resp. HMAC type, e.g. using the procedure according to RFC 5705 (Keying Material Exporters for Transport Layer Security (TLS)).

Consequently, the Derivate 6 of the shared secret 5 is passed to the External authentication system 2 via the External interface 15, which consequently performs the authentication of the sides of communication, including authentication of the Derivate 6 of the shared secret 5 of the data channel 1. In this way, there is performed the authentication of the Data channel 1 in connection with the sides of communication and it is proved whether the data transferred through the data channel come from the right source and whether they are transferred to the right subject.

The Derivate 6 of the shared secret is passed to the External authentication system 2 in such a way that Ending 3 of the data channel on side A passes the Derivate 6 of the shared secret 5 to the target application 7 on side A, on the request of which the Derivate 6 of the shared secret 5 was calculated by the Ending 3 of the data channel 1 on side A and the Target application 7 on side A passes the Derivate 6 of the shared secret 5 through external communication means via the External interface 15 to the External authentication system 11 on side A. Similarly, Ending 4 of the data channel on side B passes the Derivate 6 of the shared secret 5 to the Target application 8 on side B, on the request of which the Derivate 6 of the shared secret 5 was calculated by Ending 4 of the data channel on side B and the target application 8 on side B passes the Derivate 6 of the shared secret 5 through external communication means to the External authentication system 12 on side B.

The way of hand over by the external communication means of the Derivate 6 of the shared secret 5 via the External interface 15 is out of the Data channel 1 and it is performed in an ordinary way, e.g. by using the technologies of local communication, like easily and intuitively performable optical communication using scanning and displaying of QR codes, built-in internal communication in the device or internal protected network of "cloud" service providers respectively secure remote communication.

Example 3

Another way of authentication of the secured data channel may be performed e.g. in such a way that—similarly to previous descriptions—there is developed a protected non-authenticates Data channel 1 between the sides A and B at first, where both of the endings 3 and 4 of the data channel have available a non-authenticated secret information—the Shared secret 5.

More, the Target application 7 on side A adds to the transfer of Ending 3 of the data channel 1 on side A the Data 9 of the target application and it is transferred in an encrypted form through the Data channel 1, from which there are developed the Additional data 16 always on the relevant side similarly like in case of Additional data in previous example. For arrangement of authentication of the data channel 1 there is consequently used the External authentication system 2 in such a way that relevant Ending 3 and 4 of the data channel calculates from the Shared secret 5 the Derivate 6 of the shared secret 5 in such a way that on request of the Target application 7—side A there is calculated the Derivate 6 of the shared secret 5 by the Ending 3 of the data channel 1 on side A and on request of the Target application 8 on side B there is calculated the Derivate 6 of the shared secret 5 by the Ending 4 of the data channel 1 on side B.

Consequently, the target applications 7 and 8 on side A and B perform modification of the Derivate 6 of the shared secret 5 using the Additional data 16 and they pass to the External authentication system 11 and 12 on side A and B the modified Derivate 6 of the shared secret 5. The modification of the derivate 6 may be performed using ordinarily used mathematic algorithms. For example it is possible to use ordinary asymmetric pseudo-random algorithms of the HASH resp. HMAC type or concatenation.

The selected method of calculation guarantees that modification of the Derivate 6 of the shared secret 5 performed by the Target application 7 on side A and by the Target application 8 on side B using the original Derivate 6 of the shared secret 5 and Additional data 16 have the same value in case of all of the inputs to be identical.

For authentication of the data channel there has been used the modified Derivate 6 of the shared secret 5 in an analogical way as in previous examples.

Example 4

The way of authentication of a secured data channel may also be performed in such a way that—similarly to previous descriptions that there is developed a protected non-authenticates Data channel 1 between the sides A and B at first, when both of the Endings 3 and 4 of the data channel 1 have available a secret information—the Shared secret 5.

Then, the External authentication system 11 on side A develops Additional data 16, i.e. a part of technical information needed for correct function of the External authentication system 2, like the network address of the External authentication system 11 on side A, identifier of authenticated session, respectively other information designed for improvement of security, like e.g. generally used "nonce" i.e. an additional information with high entropy.

The additional data 16 are passed by the External authentication system 11 on side A via the External interface 15 on side A to the Target application 7 on side A and it passes it—after possible completion or modification—for transfer to Ending 3 of the data channel 1 on side A as Data 9 of the target application, to be transferred in an encrypted form through the Data channel 1 using the Shared secret 5, decrypted by Ending 4 of the data channel 1 on side B and handed over to the Target application 8 on side B.

The Target application 8 on side B processes the transferred information in such a way that creates Additional data 16 from them. It is possible to use generally used mathematic algorithms where the way of calculation guarantees that both Additional data 16 i.e. Additional data 16 created by the External authentication system 11 on side A and Additional data 16 created by the Target application 8 on side B have the identical value in case of the transferred information to be transferred and decrypted in a correct way.

For arrangement of authentication of the data channel 1 there is consequently used the External authentication system 2 in such a way that based on request of the Target application 7 on side A there is calculated the Derivate 6 of the shared secret 5 by the Ending 3 of the data channel on side A and it is passed via the External interface 15 without any changes to the External authentication system 11 on side A. The External authentication system 11 on side A performs modification of the Derivate 6 of the shared secret 5 using Additional data 16 developed earlier by the External authentication system 11 on side A and passed to the Target application 7 on side A.

On request of the Target application 8 on side B there is calculated the Derivate 6 of the shared secret 5 by the Ending 4 of the data channel 1 on side B. It is passed to the Target application 8 on side B, which performs the modification of the Derivate 6 of the shared secret 5 using Additional data 16 and passes via the External interface 15 of the External authentication system 12 on side B the modified Derivate 6 of the shared secret 5.

The selected method of calculation guarantees that modification of the Derivate 6 of the shared secret 5 performed by the Target application 8 on side B using the original Derivate 6 of the shared secret 5 and Additional data 16 has got the same value as the modification calculated by the External authentication system 11 on side A, in case of all the inputs to be identical.

For authentication of the data channel there is used the modified Derivate 6 of the shared secret 5 in an analogical way as in previous examples.

Example 5

Another way of authentication of the secured data channel 1 using external authentication may be performed e.g. in such a way that Ending 3 of the data channel 1 on side A is performed as an internal part of the target application 7 on side A respectively that Ending 4 of the Data channel 1 on side B is performed as an internal part of the target application 8 on side B. The relevant data transfers in this example are performed inside of the target application in an analogical way as described in previous examples.

Example 6

The way of authentication of passed data derived from non-authenticated shared secret 5 of the data channel 1 using of the External authentication system 2 may be performed for example as follows:

using a cryptographic signature of passed data derived from non-authenticated shared secret 5 of the data channel 1 by authenticated secret or using encryption of passed data derived from non-authenticated shared secret 5 of the data channel 1 by authenticated secret or by a derivate calculated from data derived from non-authenticated shared secret 5 of the data channel 1 and authenticated secret used by the External authentication system 2 for authentication of the user. In this way, there is cryptographically connected the authentication of the user and the authentication of the data channel.

Example 7

The way of authentication of passed data derived from non-authenticated shared secret of the data channel using the External authentication system 2 may be performed for example as follows:

using a cryptographic signature of passed data derived from non-authenticated shared secret 5 of the data channel 1 by temporary authenticated secret or using encryption of passed data derived from non-authenticated shared secret 5 of the data channel 1 by temporary authenticated secret or by a derivate calculated from data derived from non-authenticated shared secret 5 of the data channel 1 and temporary authenticated secret used by the External authentication system 2 for authentication of the user. In this way, there is cryptographically connected the authentication of the user and the authentication of the data channel.

Example 8

And finally, way of authentication of passed data derived from non-authenticated shared secret 5 of the data channel 1 using the External authentication system 2 may be performed for example in such a way that given data derived from non-authorised shared secret 5 of the data channel 1 are used by the External authentication system 2 for user's authentication in such a way that they replace the challenge in using the authentication protocols of the challenge—response type. In this way, there is cryptographically connected the authentication of the user and the authentication of the data channel.

INDUSTRIAL APPLICABILITY

The invention can be used in any field of necessary application of authenticated secured data channel.

The invention claimed is:

1. A method of authentication of secured data channel between a first side (A) and a second side (B), said method comprising the steps of:

establishing a non-authenticated protected data channel (1) with an ending (3) of the data channel (1) on the first side (A) and an ending (4) of the data channel (1) on the second side (B), and having a target application (7) on the first side (A) and a target application (8) on the second side (B), while the endings (3) and (4) have a non-authenticated shared secret (5);

calculating data derived from the non-authenticated shared secret (5) on both the first and second sides (A, B) of the data channel (1); and passing the data derived from the non-authenticated shared secret (5) by way of external communication means outside the data channel (1) to two sides (11, 12) of an external authentication system (2), which subsequently performs authentication of the first and second sides (A, B) and authentication of the data channel (1);

wherein the external authentication system is a system, a set of programs and devices or an electronic service capable of independently performing authentication of users or systems, respectively.

2. The method according to claim 1, characterized by that the data derived from the non-authenticated shared secret (5) are obtained in such a way that the endings (3) and (4) calculate a derivate (6) of the non-authenticated shared secret (5) or the endings (3) and (4) calculate a derivate (6) from the non-authenticated shared secret (5) and additional data (14); and the derivate (6) is further modified by additional data (16).

3. The method according to claim 2, characterized by that modification of the derivate (6) of the non-authenticated shared secret (5) is performed on each of the first and second sides (A, B) independently by at least one component selected from the group consisting of the endings (3) and (4) of the data channel (1), the target application (7, 8) and the two sides (11, 12) of the external authentication system (2).

4. The method according to claim 2, characterized by that the additional data (14) and/or the additional data (16) are created on each of the first and second sides (A, B) independently by at least one component selected from the group consisting of the endings (3) and (4) of the data channel (1), the target application (7, 8) and the two sides (11, 12) of the external authentication system (2).

5. The method according to claim 2, characterized by that the data derived from the non-authenticated shared secret (5) are obtained in such a way that the endings (3) and (4) calculate the derivate (6) of the non-authenticated shared secret (5).

6. The method according to claim 2, characterized by that the data derived from the non-authenticated shared secret (5) are obtained in such a way that the endings (3) and (4) calculate the derivate (6) of the non-authenticated shared secret (5) and the additional data (14).

7. The method according to claim 2, characterized by that the data derived from the non-authenticated shared secret (5)

are obtained in such a way that the endings (3) and (4) calculate the derivate (6) of the non-authenticated shared secret (5) and consequently modify the derivate (6) of the target application (7) and (8) with additional data (16).

8. The method according to claim 2, characterized by that the data derived from the non-authenticated shared secret (5) are obtained in such a way that the endings (3) and (4) calculate the derivate (6) of the non-authenticated shared secret (5) and the additional data (14), and consequently the target applications (7) and (8) modify it with the additional data (16).

9. The method according to claim 2, wherein the derivate (6) of the non-authenticated shared secret (5) is passed to the external authentication system (2) by way of an external interface (15).

10. The method according to claim 1, characterized by that the authentication of the data derived from the non-authenticated shared secret (5) is performed using the external authentication system (2) using a cryptographic signature using an authenticated signature key of the user and/or the system.

11. The method according to claim 1, characterized by that the authentication of the data derived from the non-authenticated shared secret (5) is performed using the external authentication system (2) by encryption using an authenticated encryption key of the user and/or the system.

12. The method according to claim 1, characterized by that the authentication of the data derived from the non-authenticated shared secret (5) is performed using the external authentication system (2) by comparison of derivates created from the data derived from the non-authenticated shared secret (5) and authenticated secret of the user and/or the system.

13. The method according to claim 1, characterized by that the authentication of the data derived from the non-authenticated shared secret (5) is performed using the external authentication system (2) using a cryptographic signature using a temporary authenticated signature key of the user and/or the system and/or the system using the external authentication system (2).

14. The method according to claim 1, characterized by that the authentication of the data derived from the non-authenticated shared secret (5) is performed using the external authentication system (2) by encryption using a temporary encryption key authenticated during authentication of the user and/or the system and/or using the external authentication system (2).

15. The method according to claim 1, characterized by that the authentication of the data derived from the non-authenticated shared secret (5) is performed using the external authentication system (2) by comparison of derivates created from the data derived from the non-authenticated shared secret (5) and a temporary authenticated secret of the user and/or the system using the external authentication system (2).

16. The method according to claim 1, characterized by that the authentication of the data derived from the non-authenticated shared secret (5) is performed using the external authentication system (2) in such a way that handed over data derived from the non-authenticated shared secret (5) of the data channel (1) is used by the external authentication system (2) for authentication of the user in such a way that they replace the challenge in using authentication protocols of a challenge-response type.

17. The method according to claim 1, wherein the first side (A) and the second side (B) of the data channel (1) and the two sides (11, 12) of the external authentication system (2) communicate by way of a wide area network or a local network.

* * * * *